(12) United States Patent
Khatib et al.

(10) Patent No.: US 7,787,657 B2
(45) Date of Patent: Aug. 31, 2010

(54) SAR ATR TREELINE EXTENDED OPERATING CONDITION

(75) Inventors: Nader Khatib, Anaheim, CA (US); Albert Ezekiel, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/381,249

(22) Filed: Mar. 9, 2009

(65) Prior Publication Data

US 2009/0174595 A1  Jul. 9, 2009

Related U.S. Application Data

(62) Division of application No. 11/232,807, filed on Sep. 22, 2005, now abandoned.

(51) Int. Cl.
  *G06K 9/48* (2006.01)
(52) U.S. Cl. .................. 382/103; 382/199; 382/274
(58) Field of Classification Search .......... 382/103, 382/199, 254, 260, 276; 342/179, 159, 195
  See application file for complete search history.

(56) References Cited

U.S. PATENT DOCUMENTS

| | | | |
|---|---|---|---|
| 5,345,242 A | 9/1994 | Roberts et al. ............... 342/159 |
| 5,561,431 A | 10/1996 | Peele et al. .................... 342/90 |
| 5,754,694 A | 5/1998 | Villalba ....................... 382/226 |
| 5,937,078 A | 8/1999 | Hyland et al. ............... 382/103 |
| 5,982,934 A | 11/1999 | Villalba ....................... 382/226 |
| 6,337,654 B1 | 1/2002 | Richardson et al. ........... 342/90 |
| 6,426,718 B1 | 7/2002 | Ridgway .................... 342/160 |
| 6,437,728 B1 | 8/2002 | Richardson et al. ........... 342/90 |
| 7,095,358 B2 | 8/2006 | Krikorian et al. .......... 342/25 B |
| 2001/0048753 A1* | 12/2001 | Lee et al. ..................... 382/103 |
| 2002/0057216 A1 | 5/2002 | Richardson et al. ........... 342/25 |
| 2002/0154798 A1* | 10/2002 | Cong et al. .................. 382/128 |
| 2003/0072470 A1 | 4/2003 | Lee ............................. 382/103 |
| 2003/0076980 A1* | 4/2003 | Zhang et al. ................. 382/103 |
| 2003/0164792 A1 | 9/2003 | Jahangir et al. ............... 342/90 |
| 2005/0058322 A1* | 3/2005 | Farmer et al. ............... 382/103 |

* cited by examiner

*Primary Examiner*—Andrew W Johns
(74) *Attorney, Agent, or Firm*—Christie, Parker & Hale, LLP

(57) ABSTRACT

A synthetic aperture radar acquires an image of one or more objects and identifies them as targets. The objects are located in the proximity of clutter within the image such of trees, or a tree line. The radar acquires a SAR image having pixels descriptive of the clutter and the object(s). Regions having object pixels are identified within the synthetic aperture image using an object identification (algorithm), where the object identification (algorithm) utilizes one or more historically known target characteristics and one or more measured characteristic to obtain an output. Boundaries are identified for the one or more objects within the output using an object isolation, such as, for example, a Watershed transform. Clutter pixels are identified external to the one or more objects. The clutter pixels are suppressed from the synthetic aperture image thereby generating a clutter reduced image containing the one or more objects. The objects are compared with known images of a probable target until a match is found, the match representing the target identification.

21 Claims, 6 Drawing Sheets

SAR ATR TREELINE EXTENDED OPERATING CONDITION

CROSS-REFERENCE TO RELATED APPLICATION

This is a Divisional Application of U.S. patent application Ser. No. 11/232,807 filed Sep. 22, 2005 (now abandoned) by Nader Khatib et al, and entitled SAR ATR TREELINE EXTENDED OPERATING CONDITION.

BACKGROUND OF THE INVENTION

1. Field of Invention

This invention is in the field of target identification in the presence of clutter, said clutter generated by trees and associated tree lines.

2. Description of the Related Art

An important function of a radar system, whether a Real Beam type, Synthetic Aperture (SAR) or Interferometric SAR is to detect a target as well as identify it. Radar target detection and identification have been proven necessary in military surveillance, reconnaissance, and combat missions. The detection and identification of targets provide real-time assessment of the number and the locations of targets of interest.

One method of target detection and identification is to process the image acquired by the radar using, for example, Synthetic Aperture Radar (SAR) technology. By processing a SAR generated image, the features of a target can be extracted and matched to a database for identification.

The general principle behind SAR is to obtain high resolution images by coherently combining the amplitude and phase information of separate radar returns from a plurality of sequentially transmitted pulses from a relatively small antenna on a moving platform. The returns from the plurality of pulses transmitted during a SAR image, when coherently combined and processed, result in image quality comparable to a longer antenna, corresponding approximately to the synthetic "length" traveled by the antenna during the acquisition of the image.

Attempts have been made towards target identification extracted from SAR radar images. For example, J. Wissinger, et. al., in *MSTAR's Extensible Search Engine and Model-Based Inferencing Toolkit*, SPIE 13th Annual International Symposium on AeroSene, Algorithms for SAR Imagery VI, rely on models to implement an algorithm for target identification. During operation, all targets under consideration are forced into one of the known target classes. There is no mechanism to adapt for an unknown target. Thus a high false alarm rate is encountered.

Similarly, J. De Bonet, P. Viola, and J. Fisher, in *Flexible Histograms: A Multiresolution Target Discrimination Model*, SPIE Proceedings, 1998, rely only on multiscale features of targets. Again, this yields a relatively high false alarm rate.

The false alarm rate and probability of misdetection also increases when a target of interest is in the vicinity of trees, typically near a tree line. The presence of the tree line adds clutter to the SAR image, changing the contour, obfuscating the rendition of a target in the SAR image and thereby significantly reducing the ability of automated processing techniques to detect and identify targets.

Because of above limitations of the prior art, high false alarm rates are encountered, along with inaccurate target detection and target mis-identification, thereby limiting the utility of an imaging and target detection radar.

SUMMARY OF THE INVENTION

A synthetic aperture radar acquires an image of one or more objects and identifies the one or more objects as targets. The one or more objects are located in the proximity of clutter within the image. The objects, i.e. possible target candidates, are located in the proximity of trees, or a tree line, and may be partially covered or obscured by the trees.

The synthetic aperture radar comprises an analog to digital converter for converting a plurality of radar returns into a digital stream, the radar returns representing the clutter and the objects to be identified along with a computer for:

converting the digital stream into a synthetic aperture image having clutter pixels descriptive of the clutter and object pixels descriptive of the one or more objects;

identifying one or more regions having object pixels within the synthetic aperture image using an object identification (algorithm), where the object identification (algorithm) utilizes one or more historically known target characteristic and one or more measured characteristic to obtain an output;

identifying boundaries for the one or more of objects within the output using an object isolation, such, for example, as a Watershed transform;

identifying clutter pixels external to the one or more objects;

suppressing the clutter pixels from the synthetic aperture image thereby generating a clutter reduced image containing the one or more objects;

comparing each of the one or more objects within the clutter reduced image with known images of a probable target until a match is found, the match representing the target identification.

An example of a historically known target characteristic are bright pixels within the synthetic aperture image.

An example of a measured target characteristic is a density image above a threshold extracted from the synthetic aperture image.

An example of an output from the object identification (algorithm) is a density image extracted from the SAR image. In a typical embodiment, the density image is composed of a concentration of image pixels having an amplitude above a threshold.

In another typical embodiment, object isolation is performed using a Watershed transform operating on the density image, or output.

Where faster target identification is desired, the one or more objects within the clutter reduced image are sorted in order of most likely to be a target using a criterion indicative of the target's characteristics, such as maximum density.

Further target identification speed improvements are gained by having the synthetic aperture image masked to generate one or more masks and then sorted by maximum density of each of said masks.

DETAILED DESCRIPTION OF THE INVENTION

The present invention describes an apparatus and method for separating clutter pixels from object pixels in a SAR image thereby facilitating identification of the object as a target. The target is identified by comparing object pixels with previously stored models of targets. The invention is suited for SAR Automatic Target Recognition (ATR) tree line Extended Operating Condition where objects, or potential targets, may be partially obscured because of the object location in the vicinity of clutter or clutter causing sources, such as trees, or trees forming tree lines.

Figure 1:
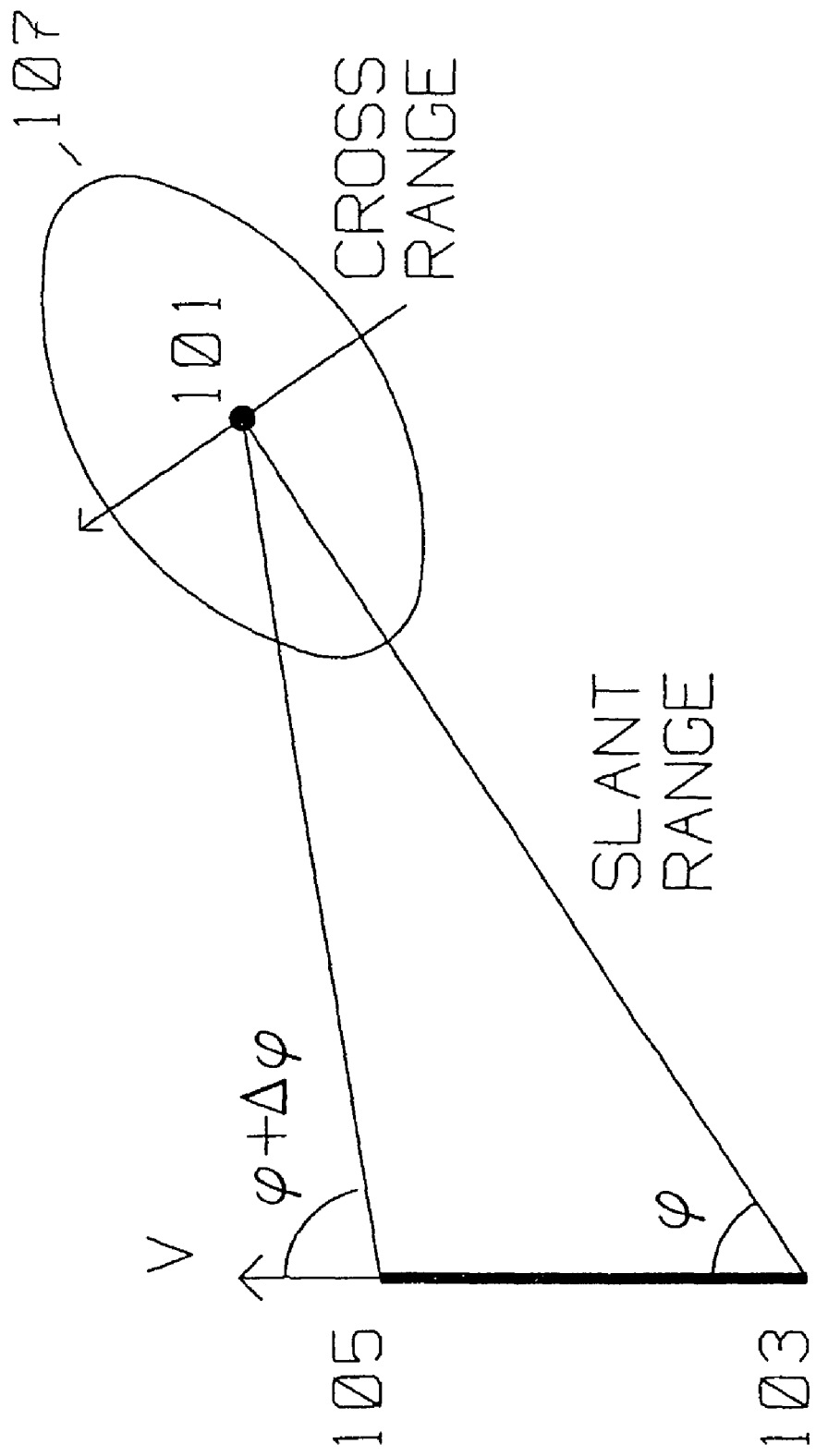
FIG. 1 is a SAR radar of the prior art used in generating an image of a target to be identified using the present invention.

The first step is to acquire a Synthetic Aperture (SAR) image of the scene containing the object to be identified as possible targets. FIG. 1 shows the typical prior art geometric relationship between a moving platform carrying a radar transmitter/receiver using Synthetic Aperture (SAR) spotlight methods and scene 107 containing an object (possible target) 101 to be imaged by said radar transmitter/receiver. The moving platform is initially at position 103, travels with velocity V in the direction shown to position 105. In SAR spotlight mode, the SAR antenna is actively oriented towards object 101 as the platform moves with respect to object 101 with velocity V. The moving platform moves from position 103 to position 105, while adjusting the side looking angle from $\phi$ to $\phi+\Delta\phi$ for spotlight mode so that the antenna keeps illuminating scene 107. Antenna illumination with radar energy covers scene 107 during the frame length, and includes object 101. Similarly, the antenna receive pattern covers scene 107, and includes object 101. Radar pulses are transmitted and corresponding returns received at many points during the frame length between position 103 and position 105. SAR radar is well known in the art and, for example, is described by W. Carrara, et al, in *Spotlight Synthetic Aperture Radar*, Artech house, 1995, incorporated herein be reference in its entirety. The spotlight mode is used as a SAR example, however, the present invention will function with other SAR mapping/object acquisition methods.

Figure 2:
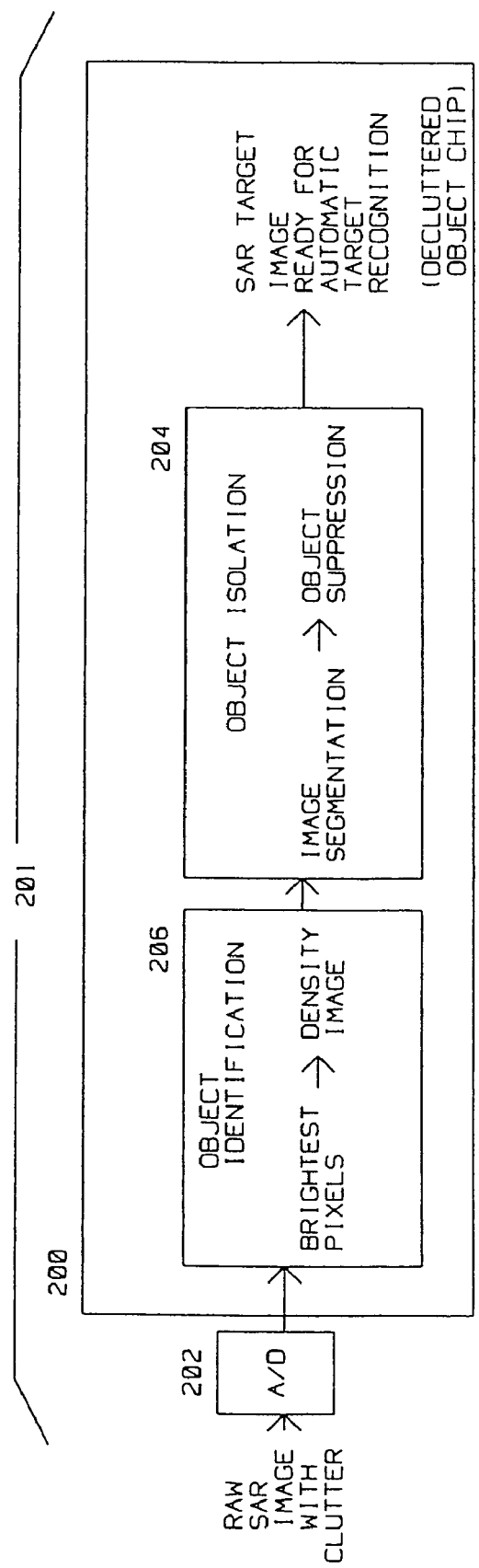
FIG. 2 shows the radar of the present invention.

FIG. 2 shows a synthetic aperture radar 201 for acquiring an image of an object (a possible target) 101 in a scene 107 and computing a target identification for said object 101. The object 101 is located in the proximity of a source of clutter, such as, for example, trees. The trees, or similar clutter, are within the scene, and generating clutter within the image because of their proximity to the target. The target is located in the proximity of trees, or a tree line, and may be partially covered or blocked by the trees. The trees generate clutter within the image.

Synthetic aperture radar 201 comprises analog to digital converter 202 for converting a plurality of radar returns from the scene 107 into a digital stream, said radar returns represent the clutter and the target.

A computer 200 is provided for converting the digital stream from A/D converter 202 into a synthetic aperture image having clutter pixels descriptive of the clutter and object pixels descriptive of the object to be identified into a possible target.

Computer 200 also identifies one or more target regions within scene 107 having object pixels within said synthetic aperture image using an object identification 206. Object identification 206 utilizes one or more historically known target characteristic, such as looking for the brightest pixels within the SAR image. Also, Object identification 206 uses measured image characteristics, such as a density of the bright pixels (density image) above a threshold.

Computer 200 may be remotely located. In this case, the data can be processed in batch mode.

Computer 200 identifies the boundaries of one or more objects in the synthetic aperture image using image segmentation 204. Segmentation 204 uses a threshold of the density image and application of a watershed algorithm to identify the boundaries of said one or more objects.

Once the objects have been identified, computer 200 deletes associated clutter pixels (or suppresses them from further target identification calculations) from the synthetic aperture image thereby generating a clutter reduced image. Now, the clutter reduced image contains the objects (targets), but little, if any, of the clutter.

Computer 200 compares the clutter reduced image (containing the object pixels) with known images of a probable target until a match is found, said match representing said target identification.

Figure 3:
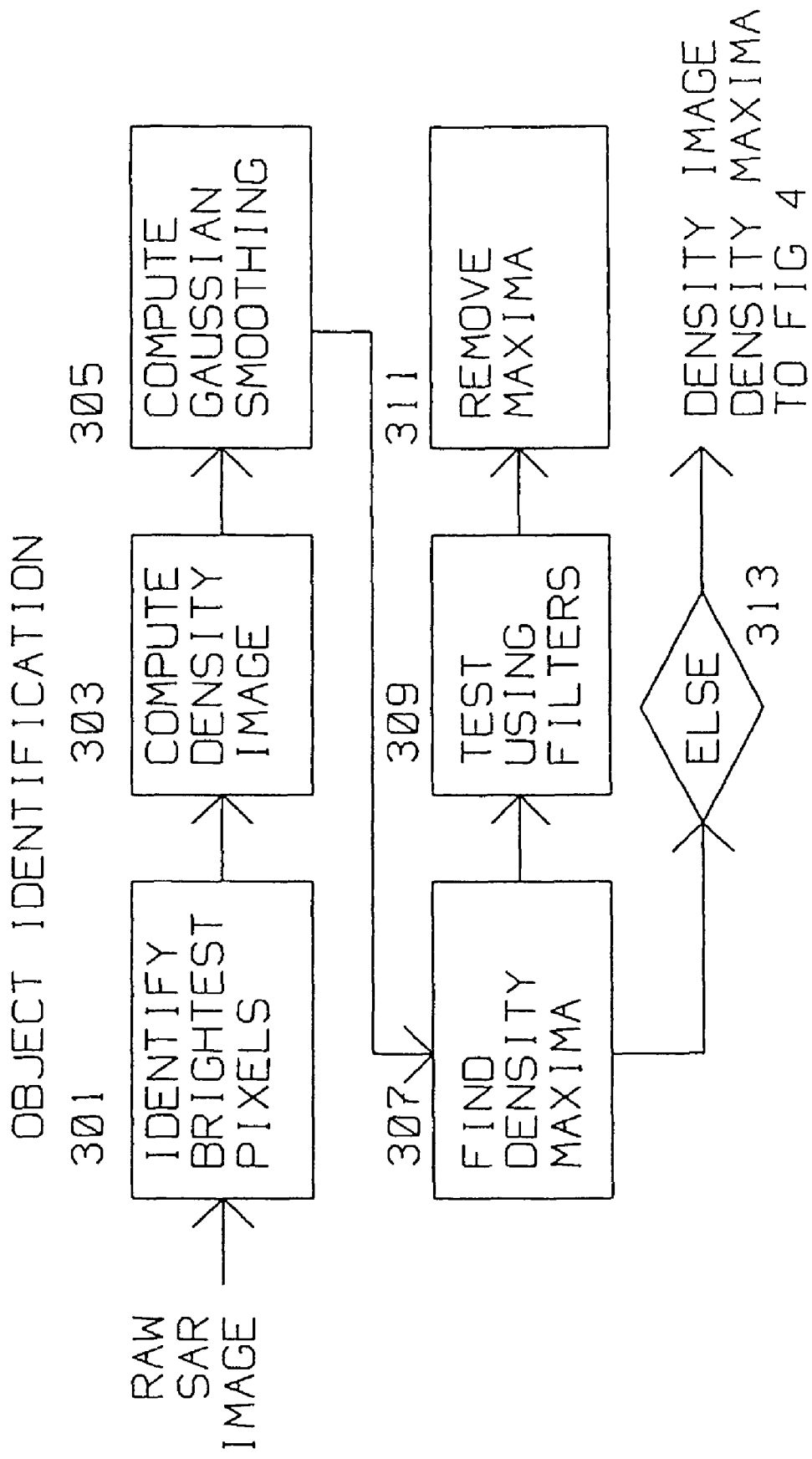
FIG. 3 shows the steps used for object identification.

Further details explaining the concepts of the invention with an exemplary embodiment is further detailed in FIG. 3. Here, a raw SAR image, or SAR image chip, is examined in Identify Brightest Pixels 301, where the brightest pixels in the image are identified. Typically 2 percent of the top brightest points are identified. The distribution of these brightest points is analyzed using a density window of, for example 13 pixels, in Compute Density Image 303. The 13 pixels correspond to a window size approximating that of a typical target in a 1 foot resolution system. For other resolutions, a different number of pixels are applicable, as the window is resolution dependent. The result from Compute Density Image 303 is Gaussian Smoothed in compute Gaussian Smoothing 305 using a Gaussian filter size of, for example, 15 pixels and a Gaussian Scaling factor for the filter of 5 pixels, ⅓ the size of the smoothing filter. The exemplary Gaussian filter size of 15 pixels is slightly larger than the 13 pixels used in Compute Density Image 303. The Gaussian smoothing facilitates finding the density maxima in Find Density Maxima 307. The density maxima typically corresponds to the object(s) being imaged. The density maxima is tested by using Test Using Filters 309. While many tests are possible, the following examples have been found useful for a best mode implementation:

a) Relative threshold on density peaks relative to the maximum density peak in the image (chip).

b) Percentage of top points the peak must have, 5 percent.

c) Minimum number of pixels the peak must have (minimum target/object size), typical 2 percent of density window.

d) Threshold of linear distance from object in pixels, use 5 pixels, equating to 5 feet.

If test 309 is met, the maxima is declared to be an object. If test 309 is not met, the maxima in NOT an object and removed from the SAR image by Remove Maxima 311.

Figure 4:
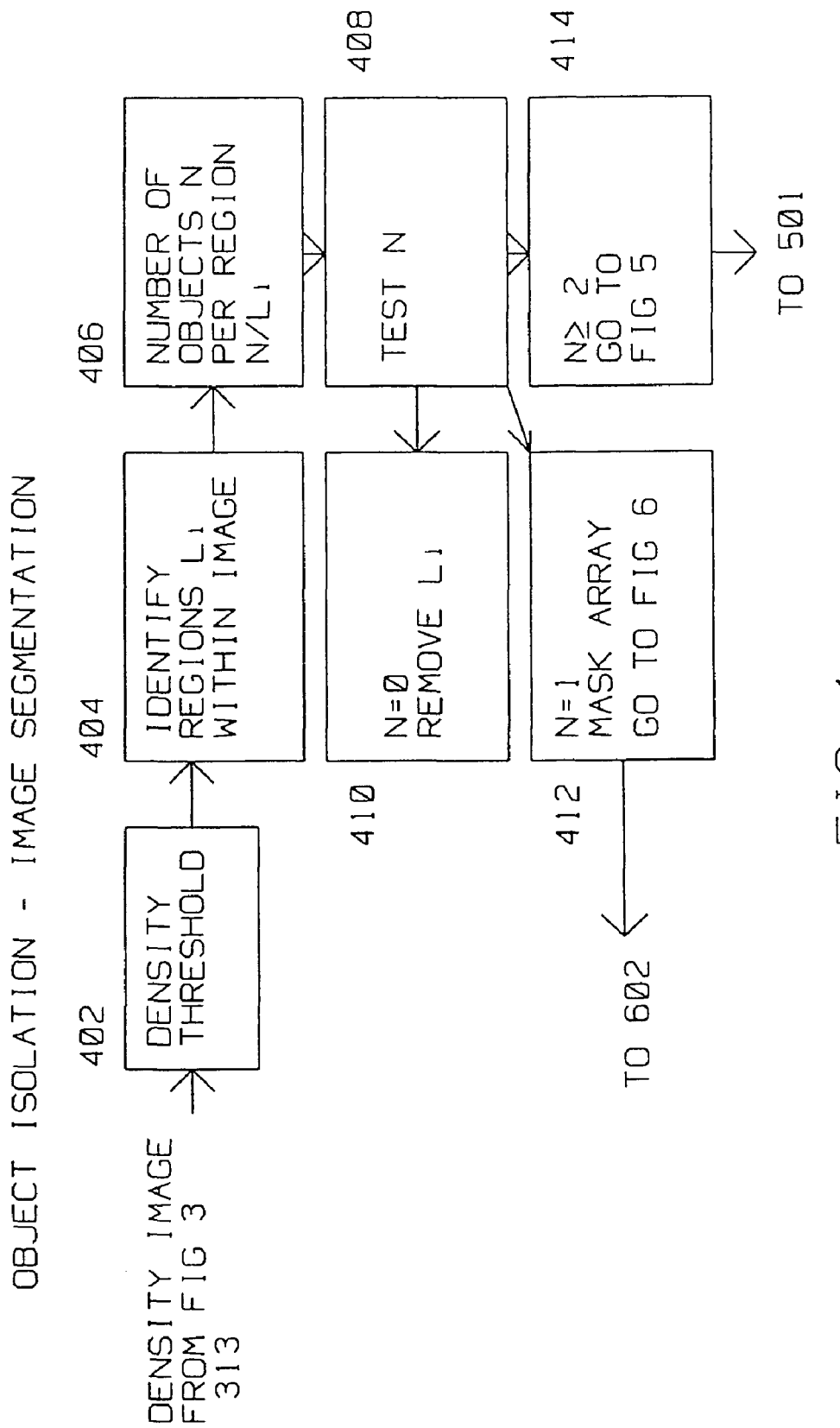
FIG. 4 shows part 1 of the object isolation—image segmentation portion of this invention.

ELSE 319 redirects the object (SAR image, image chip, portion of SAR image, density image) being analyzed to FIG. 4.

FIG. 4 is part of the object isolation/image segmentation portion. If density peaks being examined in FIG. 3 are determined to be an object, the density image is further analyzed to determine the extent of the object. The density image is subjected to a density threshold 402. That is, every pixel is compared to a threshold. Typically, a threshold 0.10 of maximum amplitude is used. Some portions of the SAR image will pass the threshold, some will not. The points passing the threshold are grouped together into regions $L_i$ in Identify Regions $L_i$ Within Image 404. In Number of Objects per Region $N/L_i$, the number of objects N within each identified region are counted. In Test N 408, there are three outcomes for N:

N=0

N=1 or

N≧2.

For N=0, it means no objects have been found within that particular region $L_i$, thus the region is removed from further consideration in N=0 Remove $L_i$, 410.

If N=1, it means exactly one object has been found in region $L_i$. Thus the particular $L_i$ region where N=1 has been identified as containing an object, and the object is possibly a target. In N=1 MASK ARRAY GO TO FIG. 6, 412 a mask is created identifying the region $L_i$ in the SAR image that contains the object corresponding to N=1.

If N≧2 it means two or more objects have been found within the region. Thus, it is likely two objects are closely spaced. In this case, N≧2 GO TO FIG. 5, 414 sends the information contained in the respective region to FIG. 5, to Find Saddle Points 501 for further analysis.

Figure 5:
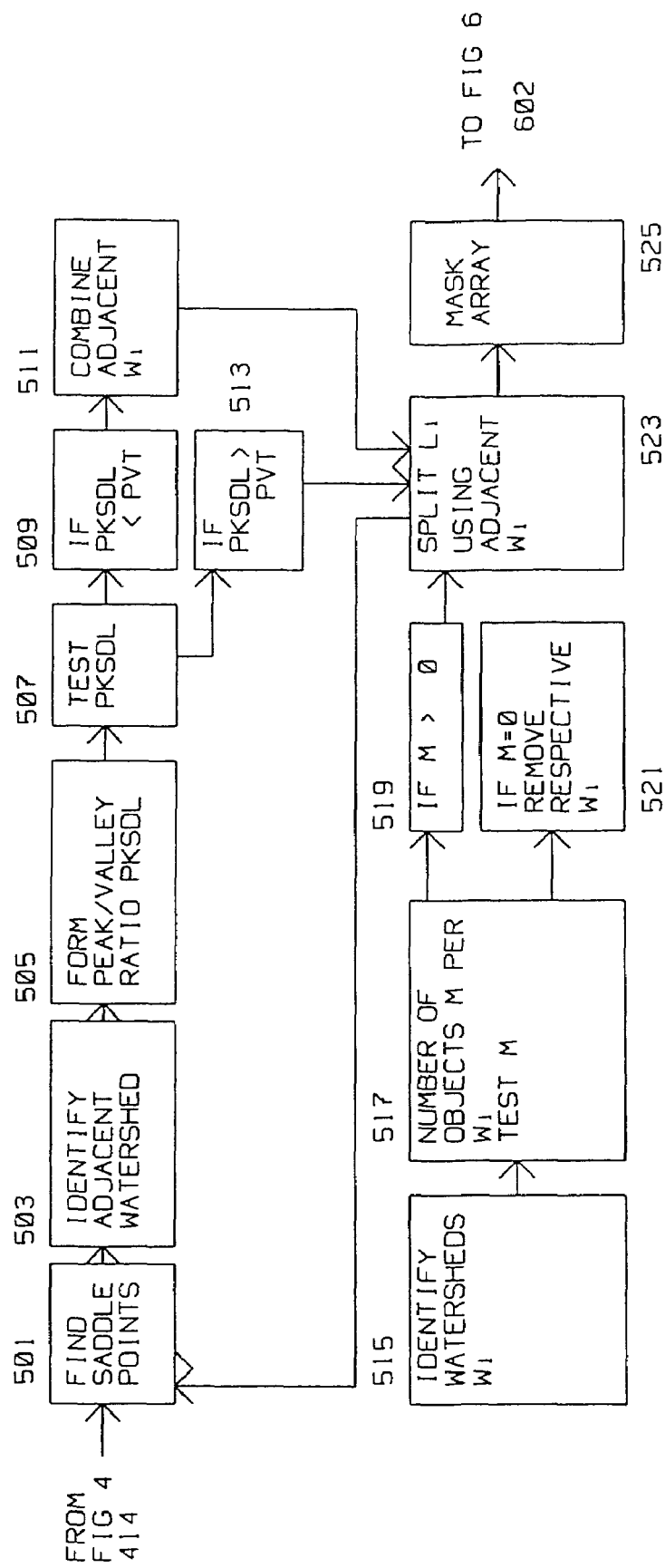
FIG. 5 shows part 2 of the object isolation—image segmentation portion of this invention.

As shown in FIG. 5, the density image is presented to Watershed transformation Identify Watersheds $W_i$ 515. Number of Objects M per $W_i$, Test M, 517 finds the spatial extent of a masked region and determines if the detected region has a number of objects (possible targets) found by the Watershed transformation, and tests M. If M>0, 519 will direct a particular $W_i$ for M greater than zero for further consideration. If M=0, Remove Respective $W_i$, 521 will remove a particular Watershed transformation $W_i$ from consideration, as no objects can be found within.

A Watershed transformation containing one or more objects from 519 is sent to Split $L_i$ Using Adjacent $W_i$, 523. From there, the information is sent to the start of a loop, Find Saddle Points, 501. After identifying saddle points, adjacent watershed is found in Identify Adjacent Watershed 503. The peak to valley ratio PKSDL is computed in Form Peak/Valley Ratio PKSDL, 505. PKSDL is tested in Test PKSDL 507. Typically PKSDL, the peak is tested with respect to a limit PVT, typically to be 10 percent higher than the neighboring valley. In IF PVT≧PKSDL 509, if PVT is found larger than PKSDL (10 percent), adjacent watershed(s) found in 503 are combined in Combine Adjacent $W_i$, 511, and sent to 523. Conversely, IF PKSDL≧PVT, 513 is met, there is adequate peak to valley distinction and further saddle points are sought in Split $L_i$ Using Adjacent $W_i$ 523.

Figure 6:
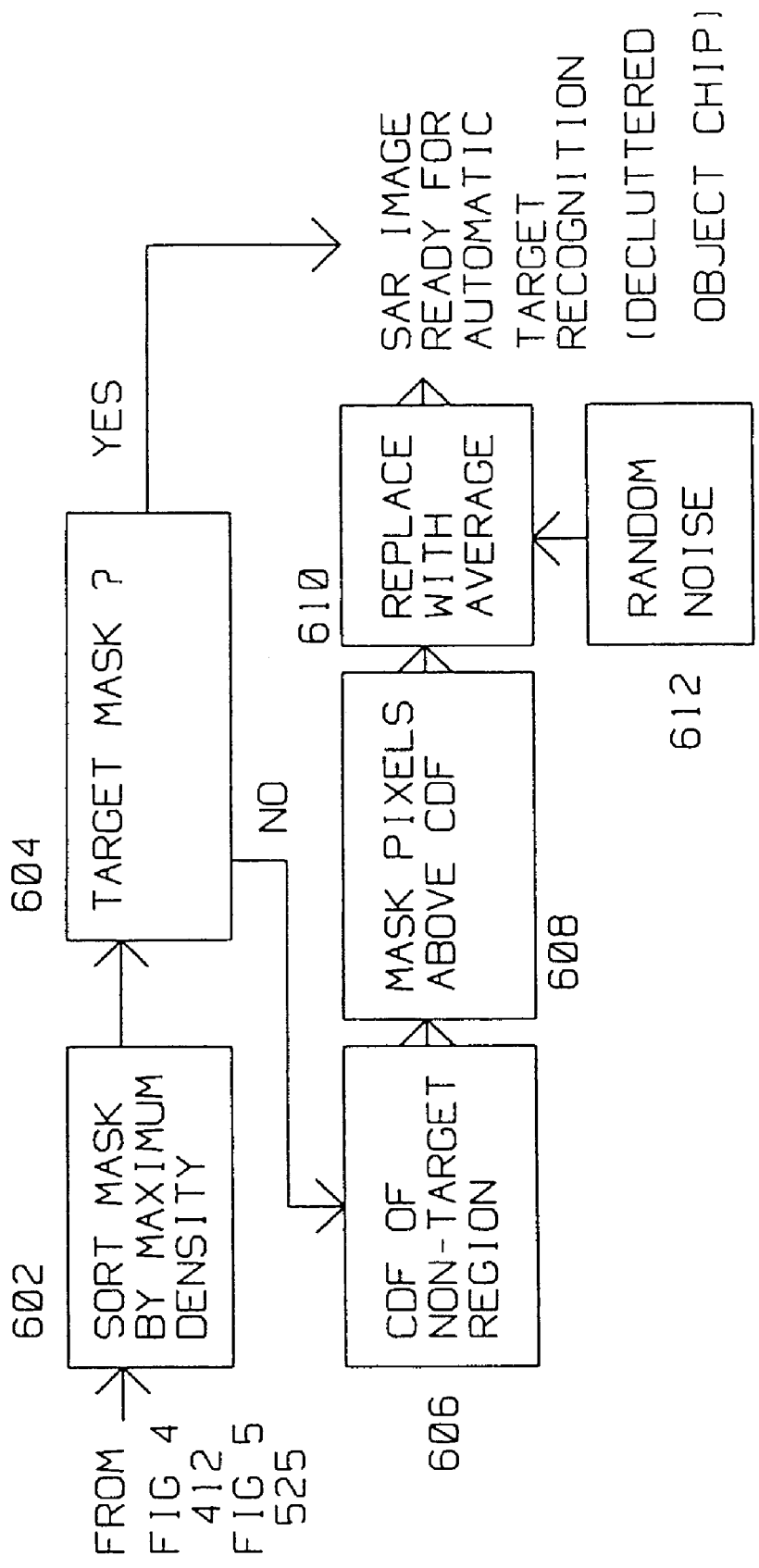
FIG. 6 shows the object isolation and object suppression steps of this invention.

The output from 523 is a masked array in Mask Array, 525 containing objects of interest to be sorted by Sort Mask by Maximum Density 602 in FIG. 6.

Continuing with FIG. 6, masks collected during the process are sorted based on the maximum density present within the mask itself in sort Mask By Maximum Density, 602. The sorted masks are examined in turn to find if they contain a target in Target Mask, 604. If a target is contained within the mask, then that mask and contents thereof are a SAR image ready for automatic target recognition. If a target is not within the mask, then CDF (Cumulative Density Function) of Non Target Region, 606 computes the CDF. Pixels above the computed CDF are masked in Mask Pixels above CDF, 608. The pixels found in 608 are replaced with average values of random noise from random noise 612 by Replace with Average, 610.

The details of the Watershed transformation as applicable to this disclosure are detailed in *The Morphological Approach to Segmentation: The Watershed Transformation* Mathematical Morphology in Image Processing, E. R. Dougherty, ed. Optical Engineering, pp 433-482, New York, Basel, Hong Kong, Marcel Dekker, 1993 and in *Topographic Distance and Watershed Lines*, by F. Meyer, Signal Processing, special issue on mathematical morphology, vol 38, no 1, pp 113-126, July 1996, incorporated herein in their entirety by reference.

All references cited in this document are incorporated herein in their entirety by reference.

Although presented in exemplary fashion employing specific embodiments, the disclosed structures are not intended to be so limited. For example, while a SAR radar is used as an example to acquire images of a target object to be identified, other imaging means using the same principles are contemplated. Sonar generated images are one example of good candidates for this method. Furthermore, although a SAR radar system is used to exemplify the use of the algorithm for target detection/identification, a sonar system could be used instead, or any other device that generates a SAR like image/data.

Those skilled in the art will also appreciate that numerous changes and modifications could be made to the embodiment described herein without departing in any way from the invention.

The invention claimed is:

1. A system for processing an image comprising:
   first means for forming a density map of said image, wherein each pixel of said density map represents a density of bright pixels around a corresponding pixel in said image, and
   second means for applying a Watershed transform to said density map to identify boundaries of one or more objects in said image.

2. The invention of claim 1 wherein said first means includes means for identifying a predetermined percentage of brightest pixels in said image.

3. The invention of claim 2 wherein said first means further includes means for computing a value for each pixel of said density map by determining a number of said brightest pixels located in a window around a corresponding pixel of said image.

4. The invention of claim 3 wherein said first means further includes means for applying a threshold to said density map to identify regions in said image containing one or more objects.

5. The invention of claim 4 wherein said system further includes means for splitting said regions to form said boundaries based on watersheds found by said Watershed transform.

6. The invention of claim 5 wherein said system further includes third means for suppressing selected pixels in said image located outside of a selected boundary to create a clutter reduced image.

7. The invention of claim 6 wherein said system further includes means for masking portions of said image to generate one or more masks and sorting said masks by a maximum density of each mask.

8. The invention of claim 6 wherein said third means includes means for computing a cumulative density function of non-targeted regions of said image.

9. The invention of claim 8 wherein said third means further includes means for replacing pixels in said image located outside of said selected boundary and having a value above said cumulative density function with noise.

10. The invention of claim 5 wherein said system further includes fourth means for determining a number of objects in each said region or watershed.

11. The invention of claim 10 wherein said fourth means includes means for identifying density maxima in said region or watershed that fit one or more predetermined criteria.

12. The invention of claim 11 wherein said system further includes means for removing regions or watersheds containing no identified density maxima.

13. The invention of claim 5 wherein said system further includes means for combining adjacent watersheds having a peak to valley ratio less than a predetermined value.

14. A method for processing an image for automatic target recognition comprising the steps of:
   forming a density map of said image, wherein each pixel of said density map represents a density of bright pixels around a corresponding pixel in said image, and
   applying a Watershed transform to said density map to identify boundaries of one or more objects in said image.

15. A method as described in claim 14 further including identifying a predetermined percentage of brightest pixels in said image.

16. A method as described in claim 15 wherein each pixel of said density map is computed by determining a number of said brightest pixels located in a window around a corresponding pixel of said image.

17. A method as described in claim 16 further including applying a threshold to said density map to identify regions in said image containing one or more objects.

18. A method as described in claim 17 further including separating objects in said regions and identifying boundaries of said objects based on watersheds found by said Watershed transform.

19. A method as described in claim 14 further including suppressing pixels in said image located outside of said boundary of a selected object to create a clutter reduced image.

20. A method as described in claim 14 further including masking portions of said image to generate one or more masks and sorting said masks by a maximum density of each mask.

21. A radar processing system comprising:
   an analog to digital converter for converting a plurality of radar returns into a digital stream;
   a computer for:
   converting said digital stream into a radar image;
   obtaining a density map of said image, wherein each pixel of said density map represents a density of bright pixels around a corresponding pixel in said image;
   applying a Watershed transform to said density map to identify a boundary of each object in said image; and
   replacing selected pixels in said image outside of the boundary of a selected object with noise to form a clutter reduced image; and
   an automatic target recognition system adapted to receive said clutter reduced image and identify said selected object.

* * * * *